United States Patent [19]

Midorikawa

[11] Patent Number: 4,815,922

[45] Date of Patent: Mar. 28, 1989

[54] METHOD AND APPARATUS FOR STORING/TAKING OUT ROD-LIKE STORED ARTICLE

[75] Inventor: Shigehisa Midorikawa, Yashio, Japan

[73] Assignee: Kabushki Kaisha Midorikawa Kogyo, Saitama, Japan

[21] Appl. No.: 186,855

[22] Filed: Apr. 27, 1988

Related U.S. Application Data

[63] Continuation of Ser. No. 734,368, May 15, 1985, abandoned.

[30] Foreign Application Priority Data

| May 16, 1984 | [JP] | Japan | 59-98248 |
| May 16, 1984 | [JP] | Japan | 59-98249 |
| May 18, 1984 | [JP] | Japan | 59-101505 |
| May 21, 1984 | [JP] | Japan | 59-102299 |
| Jun. 20, 1984 | [JP] | Japan | 59-127119 |
| Nov. 14, 1984 | [JP] | Japan | 59-240137 |
| Nov. 14, 1984 | [JP] | Japan | 59-240138 |
| Nov. 14, 1984 | [JP] | Japan | 59-240139 |
| Nov. 16, 1984 | [JP] | Japan | 59-242061 |
| Nov. 16, 1984 | [JP] | Japan | 59-242062 |
| Nov. 21, 1984 | [JP] | Japan | 59-246822 |
| Nov. 21, 1984 | [JP] | Japan | 59-246823 |

[51] Int. Cl.$^4$ .............................................. B65G 1/18
[52] U.S. Cl. .................................. 414/276; 211/94.5; 211/60.1; 403/162; 414/281; 414/277; 414/910; 414/908; 414/626; 414/661; 414/746.1
[58] Field of Search ............... 414/277, 280, 267, 281, 414/283, 626, 282, 911, 910, 908, 745, 748, 618, 659, 660, 662, 279, 672, 661; 211/60.1, 94, 94.5; 403/162, 167, 168

[56] References Cited

U.S. PATENT DOCUMENTS

| 1,736,016 | 11/1929 | Rosener | 414/911 X |
| 3,667,618 | 6/1972 | Bertola | 414/277 X |
| 3,741,419 | 6/1973 | Bergerhoff et al. | 414/282 |
| 4,204,797 | 5/1980 | Rohrscheid | 414/911 X |
| 4,238,169 | 12/1980 | DePriester et al. | 414/626 X |
| 4,354,793 | 10/1982 | Perry | 414/911 X |
| 4,364,706 | 12/1982 | Kranzlmüller | 414/283 X |
| 4,394,104 | 7/1983 | Camerini et al. | 414/276 |
| 4,563,120 | 1/1986 | Josserand | 414/280 X |

FOREIGN PATENT DOCUMENTS

| 229223 | 8/1963 | Austria | 414/267 |
| 2934619 | 3/1981 | Fed. Rep. of Germany | 414/281 |
| 2494232 | 5/1982 | France | 414/280 |
| 689354 | 4/1965 | Italy | 414/277 |
| 12204 | 2/1981 | Japan | 414/276 |

*Primary Examiner*—Frank E. Werner
*Attorney, Agent, or Firm*—Armstrong, Nikaido, Marmelstein & Kubovcik

[57] ABSTRACT

A method and an apparatus for storing/taking-out a rod-like stored article enables the article such as a printing-plate cylinder, which must be kept out of contact with other thing in its barrel surface in storing, to keep out of contact with other thing in storing/taking-out operation thereof, which apparatus use a foldable ladder-like, or a like chain-like holder unit for holding a plurality of the rod-like articles in parallel to each other at certain intervals so that the thus held articles can be transferred between its storing area and its taking-out area for use, while its storing space is remarkably reduced without fear of contact with each other.

14 Claims, 10 Drawing Sheets

FIG. 7
FIG. 8
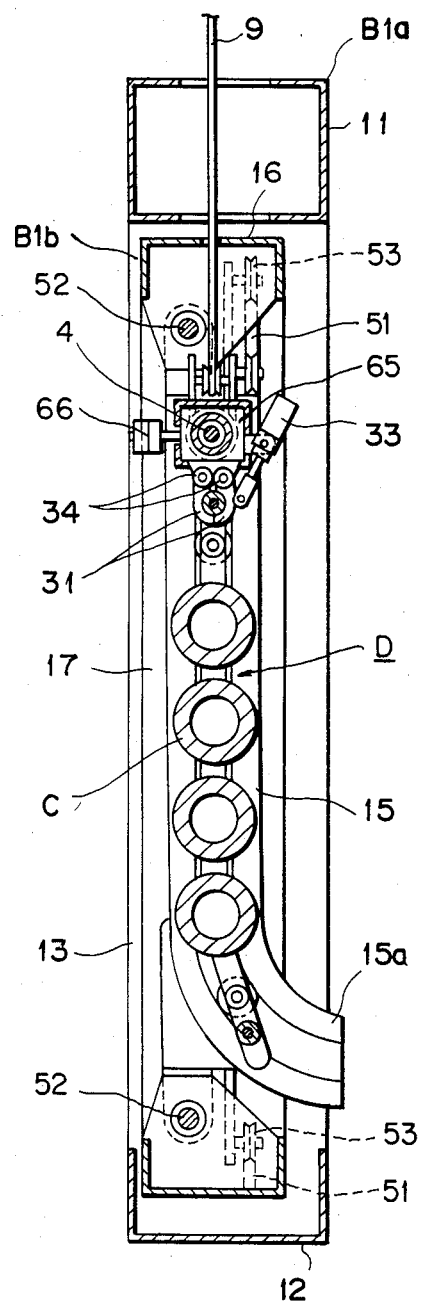
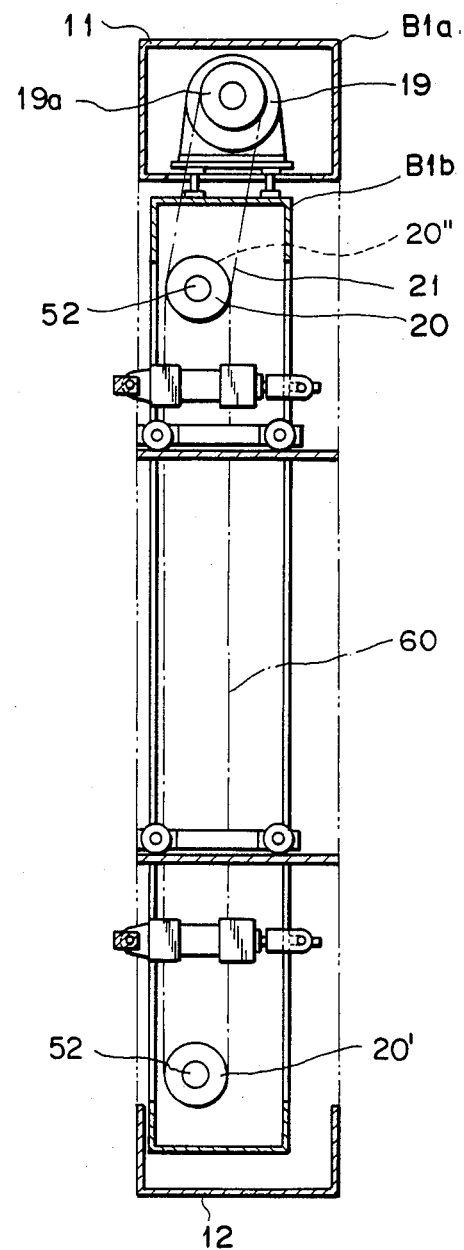

FIG. 9
FIG. 10
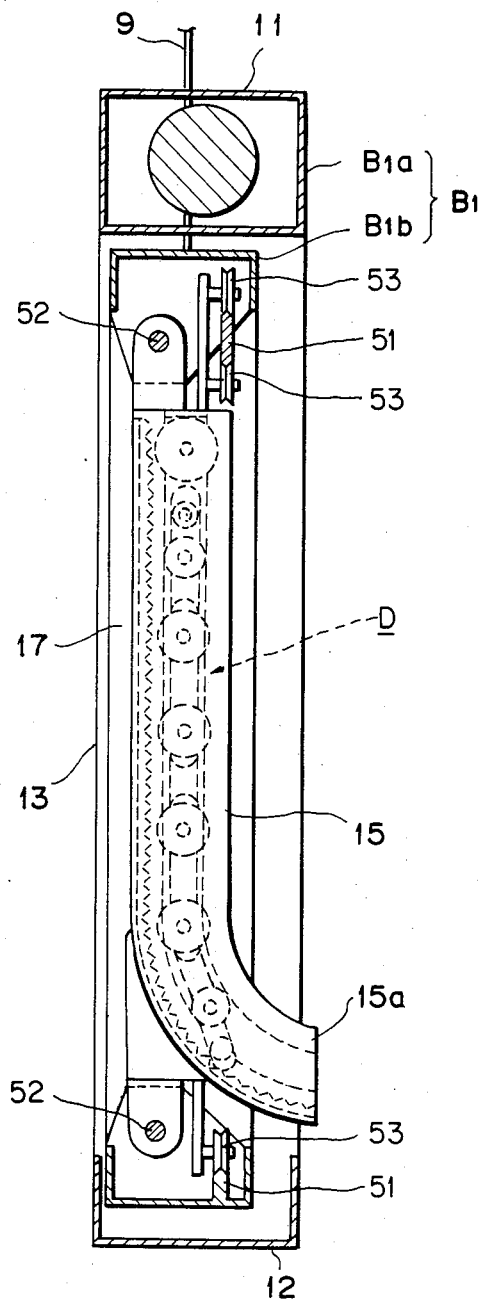
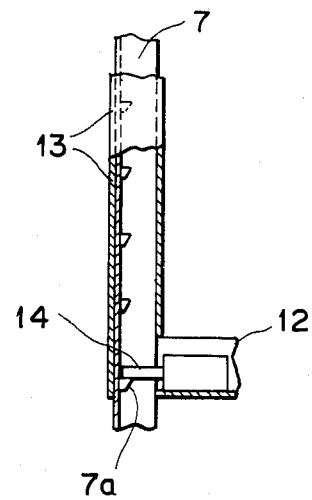

FIG. 13
FIG. 14
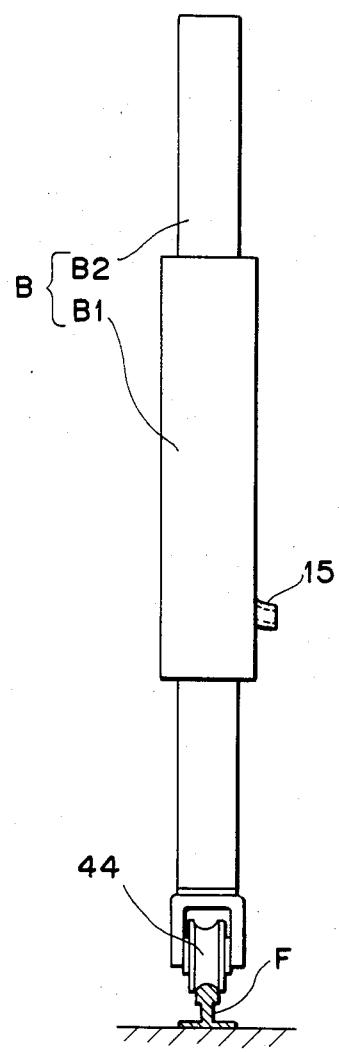
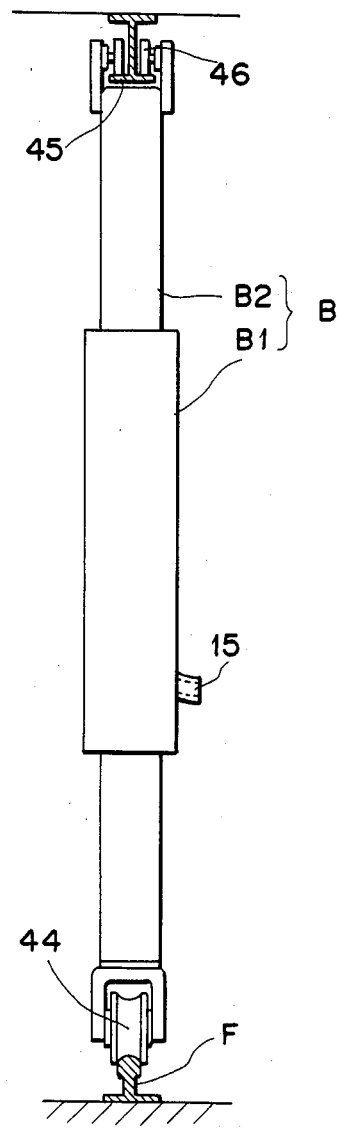

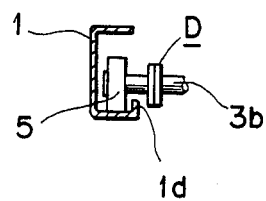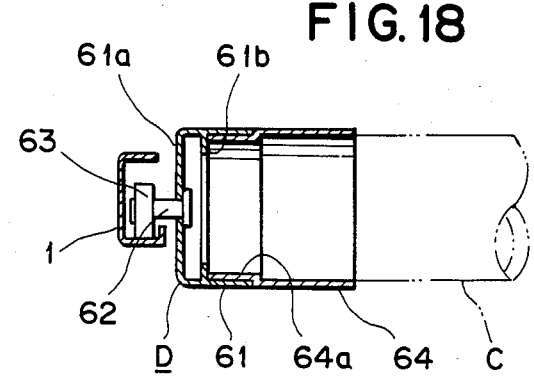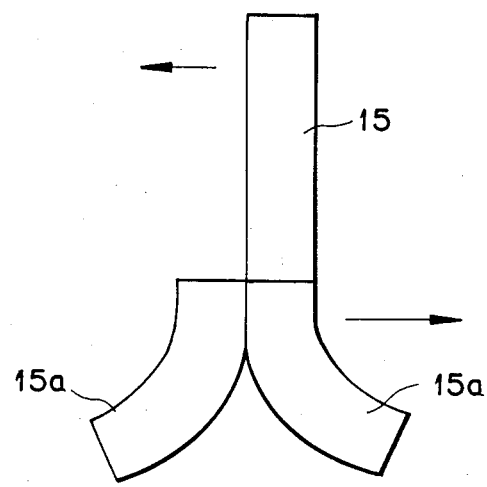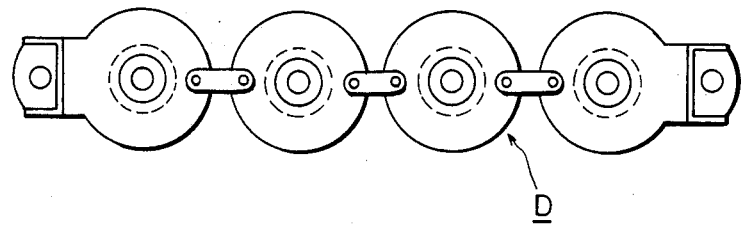

4,815,922

METHOD AND APPARATUS FOR STORING/TAKING OUT ROD-LIKE STORED ARTICLE

This is a continuation of application Ser. No. 734,368 filed May 15, 1985, now abandoned.

BACKGROUND OF THE INVENTION

1. Field of the Invention

The present invention relates to a method and an apparatus for storing and taking-out a rod-like stored article, for example, such as a printing-plate cylinder and the like which must be kept out of collision and contact with other objejcts in its storing/taking-out operation.

2. Description of the Prior Art

Hitherto, in case that the rod-like article, for example, such as the printing-plate cylinder, a rotogravure cylinder, a rod-like part and the like which must be kept out of collision and contact with other objects, particularly, the article stored simultaneously with it, is stored, a plurality of the rod-like articles are horizontally put on a multistage shelf or are simply horizontally spaced apart from each other and individually longitudinally put on a floor to be stored upright on the floor with the use of a suitable storing frame. However, any of the conventional means for storing the plurality of the rod-like articles described above requires a large storing area, and has its limit of storing capacity for the articles and further it is not easy its storing and taking-out operation of the articles, these are defects inherent in the conventional means.

SUMMARY OF THE INVENTION

The present invention is made to resolve the above defects inherent in the conventional means. Namely, according to the present invention, the plurality of the rod-like articles, which have been hitherto horizontally put on the conventional type of the shelf, are disposed in parallel to each other at certain intervals to be vertically stacked in a movable condition so that it is possible to provide the method and the apparatus for storing and taking-out the rod-like stored article, which require a lesser installation area for the apparatus while the apparatus may store neatly and fully automatically more amount of the articles and further is easy in its scale modification to vary its storing capacity in accordance with an amount of the articles required to be stored.

It is an object of the present invention to provide a method for storing and taking-out the rod-like stored article, for example, such as the printing-plate cylinder, the rotogravure cylinder, the rod-like part and the like, which method employs: a storing frame unit for storing a plurality of such rod-like articles in a multistage manner; a stored article feeding/taking-out unit; a holder unit for holding the plurality of the rod-like articles in a foldable ladder-like manner so that the plurality of the rod-like articles are held by the holder unit to be incorporated therein to form a single connected body which is fed to the storing frame unit through the stored article feeding and taking-out unit so that the connected body is stored in a horizontal condition therein in a multistage manner to make it possible that any of the thus stored connected bodies is alternatively taken out as required, in which taking-out operation the connected body is disposed vertically and transferred to a prescribed position where the connected body is released from the holder unit to be taken out.

It is another object of the present invention to provide an apparatus for storing and taking-out the rod-like stored article comprising: a holder unit for holding a plurality of the rod-like articles in a foldable ladder-like manner to form a single connected body constructed of the plurality of the rod-like articles and the holder unit; a storing frame unit for horizontally storing the connected body in a multistage manner; and a stored article feeding and taking-out unit having a facility for feeding the connected body in horizontal condition to the storing frame where the connected body is horizontally disposed, another facility for alternatively taking out the connected body out of the storing frame, and a further another facility for vertically arranging and transferring the thus taken-out connected body.

It is preferable to construct the holder unit out of a pair of extensible longitudinal bars between which each pair of a plurality of pairs of catchers are foldably connected through a suitable connecting means to be opposite to each other, which means is preferably a link chain comprising link plates connected with each other through pins.

It is preferable to construct the storing frame out of a plurality of pairs of rail elements each of which rail elements has preferably a V-shaped cross-section and slightly inclines backward.

It is preferable to construct the stored article feeding and taking-out unit of a lifting element which is movable up and down, and a bucket element having a pair of guide rails which are provided inside the lifting element and are adjustable in intervals therebetween according to the length of the stored rod-like article and further preferably have a rack means cooperating with a pinion provided in the holder unit.

BRIEF DESCRIPTION OF THE DRAWINGS

FIGS. 7 and 9 are longitudinal sectional view of portions of the associated construction of both the lifting main body constituting the lifting element, and the bucket element provided inside the lifting main body;

FIG. 8 is a diagramatical end view showing the mechanism to adjust an interval between two guide rails of the bucket element;

FIG. 10 is a partially longitudinal sectional front view of an example of the stoppage construction provided between the guide posts constructing the lifting guide element, and the lifting main body;

FIGS. 13 and 14 are side views of the stored article feeding and taking-out unit of the apparatus shown in FIG. 12;

FIG. 17 is a longitudinal sectional view of another embodiment of the rail main body for storing the rod-like article;

FIG. 18 is a longitudinal sectional view of another embodiment of the holder unit for the stored rod-like article;

FIG. 19 is a view showing another example of the guide rail; and

FIG. 20 is a side view of another embodiment of the link plate means for the holder unit.

DESCRIPTION OF THE PREFERRED EMBODIMENTS

Figure 1:
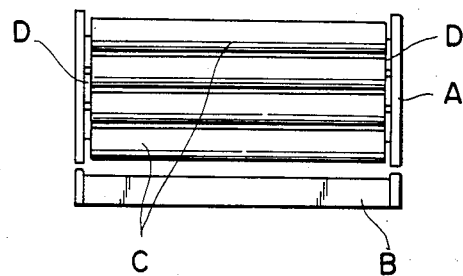
FIG. 1 is a view showing a basic technical idea of the present invention.

In FIG. 1: the reference character A designates a storing frame (hereinafter referred to as the A-unit); B designates a stored article feeding and taking-out unit (hereinafter referred to as the B-unit); C designates a rod-like article, for example, such as a printing-plate cylinder, a rotogravure cylinder, a rod-like part and the like; D designates a holder unit for holding a plurality of the rod-like articles in a foldable ladder-like manner to form a single connected body. The A-unit is so constructed that it may store the connected body in a multistage manner. The B-unit is so constructed that it may feed the connected body into the A-unit in horizontal condition, take out the same from the A-unit alternatively and dispose the same vertically. Each unit of the A-unit and the B-unit is provided to be opposite to each other. Both the A-unit and the B-unit are provided on the floor, for example, simply disposed thereon or fixed thereto directly or through a suitable projection provided on the floor, such as poles.

Figure 2:
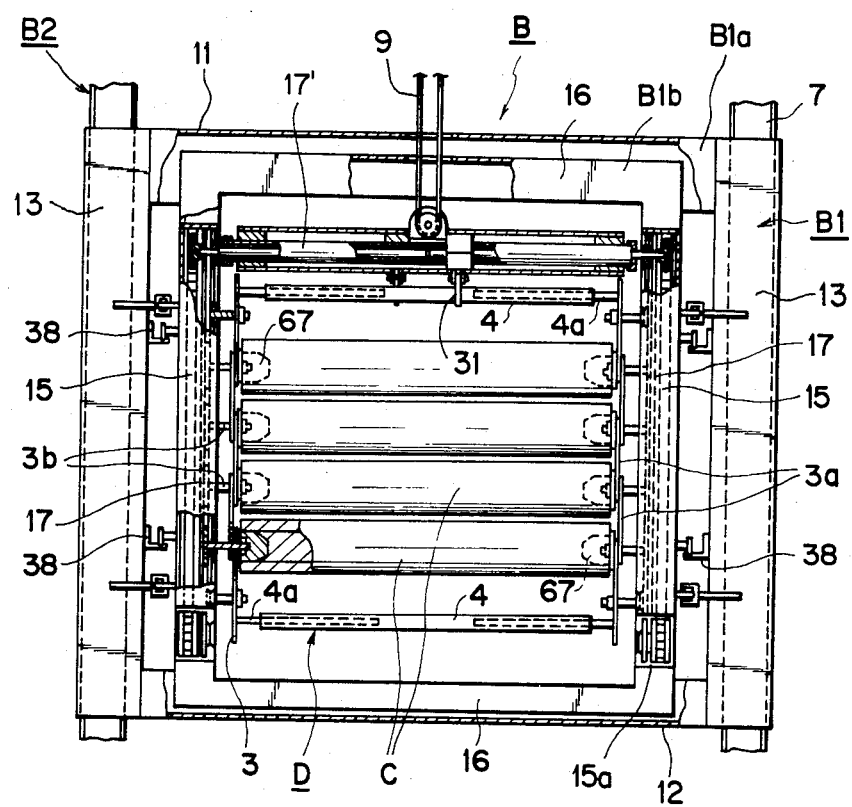
FIG. 2 is a front view of the lifting main body and the bucket element holding the holder unit of the apparatus of the present invention.

FIG. 2 shows the B-unit having an essential construction of the present invention. The B-unit comprises a lifting element B1 and a lifting guide element B2 which supports the lifting element B1 movably. The lifting element B1 comprises: a frame-like lifting main body B1a constructed of an upper transverse member 11, a lower transverse member 12 and the left and the right longitudinal members 13; and a bucket element B1b located in the lifting main body B1a. The bucket element B1b is constructed of transverse members 16 and longitudinal members 17 to be formed into a frame-like shape, and is movably supported by the lifting main body B1a through rails 38 and wheels 39 (FIG. 4) so as to move to and fro. The longitudinal member 17 is so constructed that it may receive the holder unit D and acts as guide rails 15 which will be described in detail later.

Figure 3:
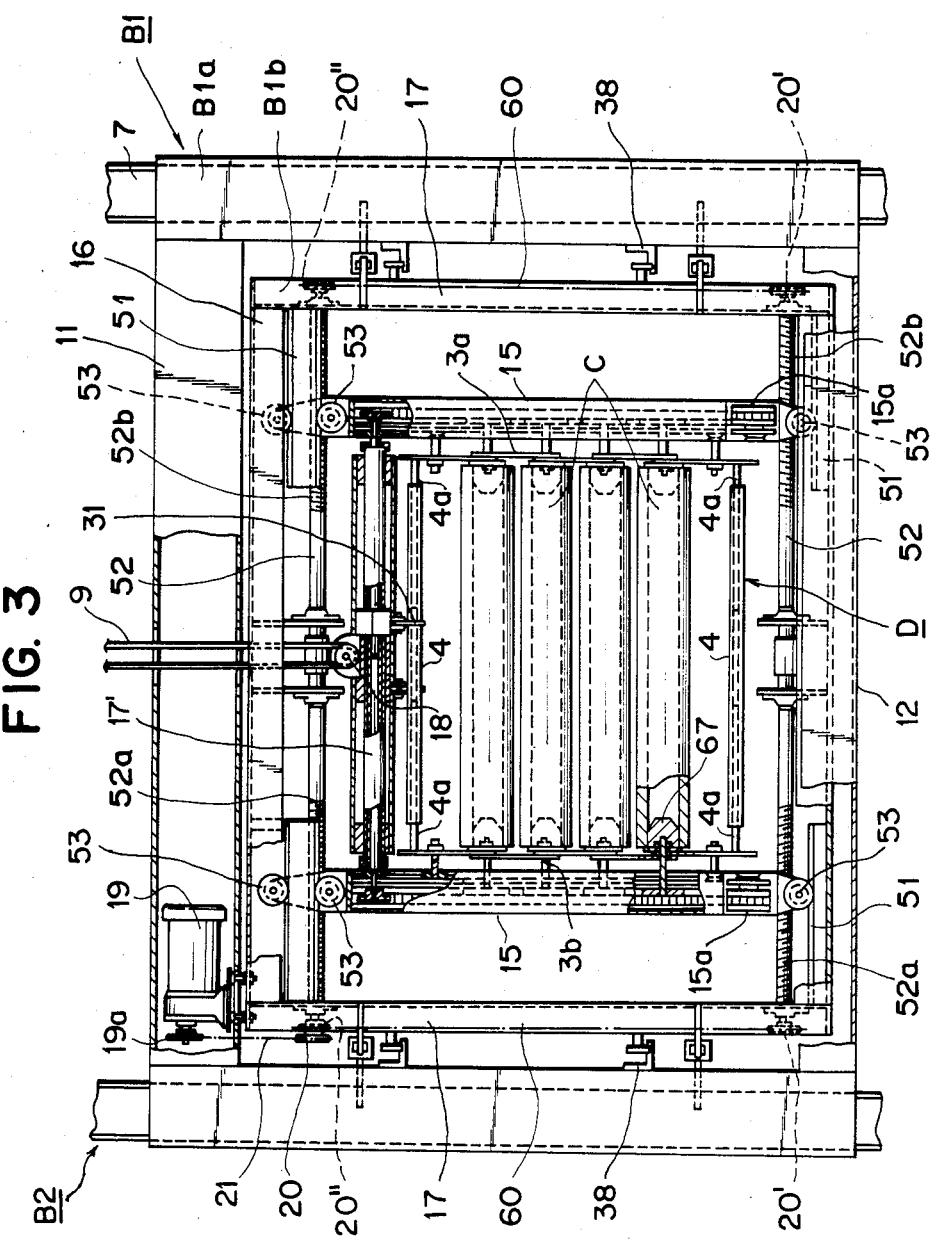
FIG. 3 is a view similar to FIG. 2, which shows another embodiment different from that shown in FIG. 2.

FIG. 3 shows an improved example of the B-unit shown in FIG. 2, in which example the longitudinal member 17 of the bucket element B1b and the guide rail 15 are separately constructed. The guide rail 15 is supported movably both leftward and rightward by rails 51 provided in both upper and lower portions of the bucket element B1b through idler wheels 53. In case of an upper and a lower portions of the guide rail 15 are provided with screws which are driven by a driving motor 19 and cooperate with screw shafts 52 provided in an upper and a lower portions of the bucket element B1b, each of which screw shafts 52 is provided with a left screw portion 52a and a right screw portion 52b, so that the screws may adjust an interval therebetween through an operation conducted by: a driving sprocket 19a fixed to a rotary shaft of the driving motor 19; driven sprocket 20 fixed to both ends of the screw shaft 52; a driving chain 21 running around the driving sprocket 55a and the driven sprocket 20; associated sprockets 20' fixed to both end of the screw shaft (lower) 52; associated sprockets 59 fixed to the driven sprockets 20; and associated chains 60 running around the associated sprocket 20' and 20".

As described above, it is preferable to vary an interval between the guide rails 15 according to the length of the rod-like stored article so that it is possible to use the same B-unit with respect to the rod-like articles having different length.

Figure 4:
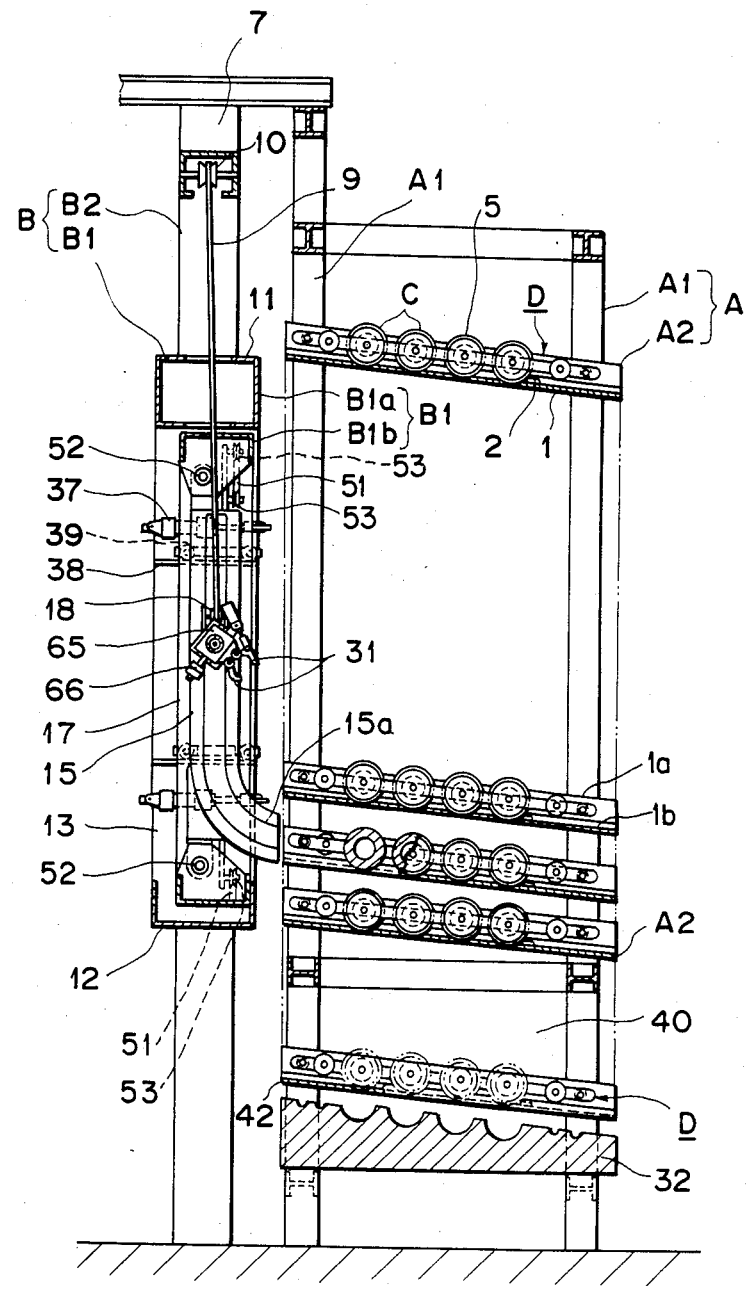
FIG. 4 is a longitudinal sectional view of the apparatus of the present invention shown in FIG. 3.

FIG. 4 is a longitudinal sectional side elevational view of an embodiment of the apparatus for storing/taking-out the rod-like stored article of the present invention. The A-unit shown in FIG. 4 is constructed of a plurality of poles A1 provided upright in a front, a rear, a left and a right portions of the apparatus of the present, and a plurality of storing portions A2 provided in the poles A1 to be inclined slightly downward in their rear ends and to be paired horizontally between the poles A1 so that each of the pair of the storing portion A2 is opposite to each other and the thus formed pairs of the storing portion A2 are provided in a multistage manner between the poles A1 as shown in FIG. 4. The storing portion A2 acts also as a rail for supporting a plurality of traveling wheels 5 of the holder unit D, in which rail is provided a stopper 2 in an appropriate portion thereof. Since the storing portion A2 is inclined slightly downward in its rear end, the holder unit is automatically stored in the storing portion A2 by gravity without any forcible assistance.

Figure 5:
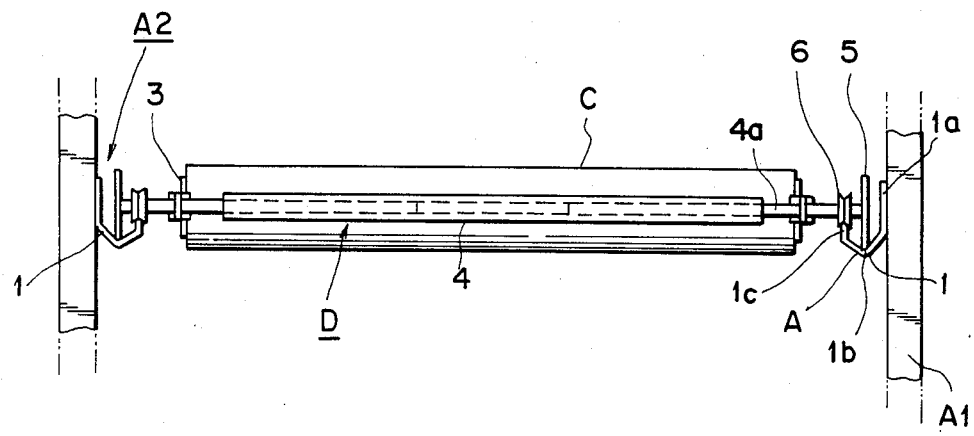
FIG. 5 is a front view of a construction of the storing rail element constituting the storing portion, the construction of the holder unit and an associated construction of both the above construction.
Figure 6:
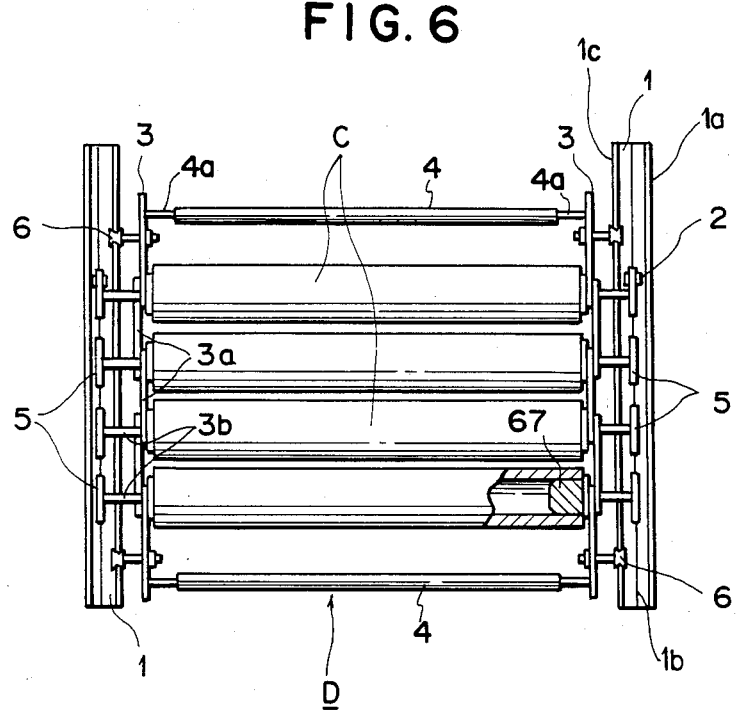
FIG. 6 is a plan view of that shown in FIG. 5.
Figure 11:
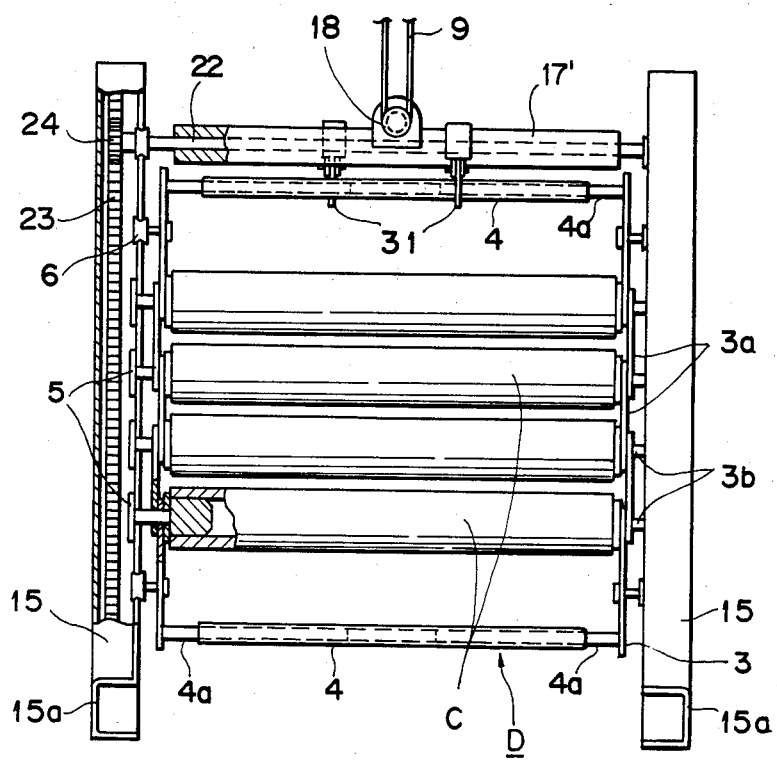
FIG. 11 is a partially broken away front view of the guide rail of the bucket element.

As clearly shown in FIG. 5, the storing portion A2 acting also as the rail has preferably a V-shaped cross-section in its lower portion. In this case, the traveling wheel 5 of the holder unit D is constructed of a thin plate, and preferably a tread portion of the traveling wheel 5 is shaped to meet the V-shaped cross-section of the lower portion of the rail, i.e., the storing portion A2, so that it is possible to prevent the holder unit D from swinging laterally to enable the same D to enter the guide rail 15 smoothly.

As shown in FIG. 17, a rail main body 1 of the rail, i.e., the storing portion A2 may have a channel-like cross-section having an upright edge 1d in its inner lower portion, in which rail main body 1 is movably provided the traveling wheel 5 which is rotatably mounted on each of a plurality of shaft pins 3b constituting a portion of the holder unit D.

In FIGS. 2 to 6 and 11, the reference character D designates a holder unit for holding a plurality of the rod-like stored articles C, for example, four articles C in a foldable ladder-like manner, which holder unit D is constructed of: a left and a right link plates 3 constructed of a plurality of link element 3a which are rotatably connected with each other by a plurality of the shaft pins 36; connecting pipes 4 provided with extensible bars 4a through which the front and the rear portions of the left and the right link plates 3 are rotatably connected; traveling wheels 5 each of which is constructed of the thin plates and is rotatably mounted on the shaft pin 3b; and grooved wheels 6 provided in a front and a rear portions of each of the front and the rear link elements 3a which constitute a portion of the left and the right link plates 3, wherein: an end 1a of the rail main body 1 having the V-shaped cross-sectional lower portion is fixed to inside the pole A1; the traveling wheel 5 travels on a bottom portion 1b of the rail main body 1; and the grooved wheel 6 travels on the other end edge 1c of the rail main body 1. In an end of each of the shaft pins 3b, which end is opposite to the other end thereof on which the traveling wheel 5 is rotatably mounted, is provided a catcher 67. Therefore, since the traveling wheel 5, the shaft pins 3b, a rotary shaft of the link element 3a, the catcher 67 and the rod-like stored article C are aligned with each other in their centers on the same axial line, there is no fear that the stored articles C are brought into contact with or abutment against each other even when the holder unit D is moved in a folding manner. FIG. 20 shows diagrammatically another embodiment of the link plate 3 of the holder unit D.

FIG. 18 shows another embodiment of the catcher 67, in which embodiment an annular bearing plate 61b is formed in an inner periphery of a circular sleeve 61 having a back plate 61a of the holder unit D, in an outside of which circular sleeve 61 is provided a traveling wheel 63 which is mounted on a shaft 62 and travels on the rail main body 1, into an inside of which circular sleeve 61 is inserted a small diameter portion 64a of an attachment 64 up to the annular bearing plate 61b, into which attachment 64 is inserted an end of the rod-like stored article C.

The holder unit D may be used as a separate instrument such as a conveyor holder for conveying the rod-like article C which must be kept out of collision and contact with other objects, in which case it is possible to add a minor modification to the holder unit D according to a purpose and condition in use.

As described above, the lifting element B1 is supported by the lifting guide element B2 movably up and down, which lifting element B1 is provided with a stopping mechanism for stopping the bucket element B1b so that lower portion 15a of the guide rail 15 of the bucket element B1b is aligned with a desired one of the storing portions A2 of the A-unit. Namely, as shown in FIG. 10, in this embodiment, a large number of engaging projections 7a are provided in the guide post 7, on each of which engaging projections 7a an engaging member 14 rests, which engaging member 14 is provided in the lower transverse member 12 to be moved forward and rearward.

Such engaging projections 7a are provided at the same intervals as those of the storing portions A2 of the A-unit. It is preferable to form the engaging projection 7a as little as possible so that the engaging projections 7a are spaced apart from each other as far as possible, whereby it is possible to easily conduct the synchronous forward and rearward movements of the engaging member 14 for stopping the lifting element B1. It is possible to replace the engaging projection 7a with other suitable means, for example, such as a series of openings wherein such openings are preferably formed as large as possible while it is also preferable because of the same reason described above to form a portion, which is not an opening and receives the engaging member 14, as narrow as possible.

It is possible to use a suitable means as a means for moving the engaging member 14 to and fro, for example, such as a metal bar moved to and fro by a solenoid unit or a swinging L-shaped member.

The reference numeral 15 designates a pair of horizontally opposite guide rails for feeding and taking-out of the plurality of the rod-like articles C which are incorporated in the holder unit D to form a single connected body therewith, which single connected body is fed to the A-unit and is taken out of the A-unit, and further transferred from the A-unit to a receiving table means which will be described later. As shown in FIG. 4, a lower portion 15a of the guide rail 15 is bent toward the A-unit to form an arc-shaped portion. The embodiment of the pair of the guide rails 15 for feeding and taking-out the rod-like articles C shown in FIG. 3 and the following drawings thereof is adjustable in an interval thereof, i.e., a distance between the pair of the guide rails 15 as described above.

A rope 9 is wound around a winch (not shown) through a guide wheel 10 in its one end while connected to a desired portion of the bucket element B1b in the other end thereof through a suspension pulley 18 provided in an upper transverse tube 17' which constitutes a part of the bucket element B1b.

In FIG. 8: the reference numeral 19 designates a motor mounted on the upper transverse member 11 which constitutes a part of the lifting main body B1a; 20 a sprocket fixed to one end of the upper screw shaft 52; and 20' a sprocket fixed to one end of the lower screw shaft 52. The sprockets 20 and 20' are rotatably driven by motor 19, through a driving sprocket 19a fixed to a rotary shaft of the motor 19 and a chain 21 running around the sprockets 19a and 20, and the sprocket 20 and a chain 60 running around the sprockets 20 and 20', respectively. The upper and lower screw shafts 52 are concurrently rotated together with the sprockets 20 and 20'.

The reference numeral 31 designates a manipulator for transferring the holder unit D by grasping a tube 4 of the holder unit D, which manipulator 31 is rotatably mounted on the rotary bar 52 through a top 65, and is operated through a pinion 34 which is rotatably driven by actuation of a hydraulic cylinder 33 as shown in FIG. 7.

It is necessary to hold the manipulator 31 in a position where an opening formed by fingers of the manipulator 31 is ready to receive the connectin pipe 4 of the holder unit D stored in the A-unit when the manipulator 31 is out of action. To this end, in the embodiment shown in FIG. 4, a weight 66 is added to an appropriate portion of the top 65 on which is mounted the manipulator 31 so that the manipulator 31 is held in an adequately inclined condition when the manipulator 31 is out of action. It is possible to hold the manipulator 31 in the adequately inclined condition by using other means for positioning the manipulator 31, not with the use of the weight 66. In FIG. 4, the reference numeral 37 designates a hydraulic cylinder for moving the bucket element B1b to and fro through a cooperation of rails 38 which are provided in the lifting main body B1a and extend to and fro and guide wheels 39 which are rotatably provided in the bucket element B1b and travel to and fro along the rails 38.

As shown in FIG. 4, a table means 32 for receiving the rod-like article C is provided in a lower space 40 of the A-unit, above which table means 32 is provided rails 42 for taking out the rod-like article C, which rails 42 are similar in construction to the rails A2 for storing the holder unit D. It is possible to provide such table means 32 in any of an upper and a middle spaces of the A-unit as required. Also provided is driving sprocket 19a fixed to a rotary shaft of the driving motor 19; a driver sprocket 20 fixed to one end of the upper screw shaft 52; a driving claim 21 running around the driving sprocket 19a and the driven sprocket 20; sprockets 20″ fixed to both ends of the upper screw shaft 52; associated sprockets 20′ fixed to both ends of the lower screw shaft 52; and associated chains 60 running around the associated sprockets 20′ and 20″ (Refer to FIG. 8).

In the method and the apparatus of the present invention, it is possible to optionally provide the table means 32. On the other hand, irrespective of the provision of the table means 32, it is possible to space the A-unit apart from a taking-out operaion place of the rod-like stored article C, for example, it is possible to provide the A-unit in a basement of a building while the taking-out operation place of the rod-like stored article C may exist in an upper floor of the same building, provided that the guide posts extend between the basement and the upper floor so that the B-unit may travel therebetween. In this case, it is not necessary to use the guide posts having straight shapes. By appropriately selecting a supporting means for the lifting element B1, it is possible to use the guide posts having curved shapes.

In the above-described construction, the connected body constructed of a plurality of the rod-like stored articles C which are held integrally by the holder unit D, is stored in each of the storing portions A2 of the A-unit, and then, as required, the lifting element B1 of the B-unit is moved up and down through action of the rope 9 and its associated mechanism so as to be brought into a position where the connected bo dy, which must be taken out, is stored. In this condition, the bucket element B1b of the lifting element B1 is brought into the above position through action of a hydraulic cylinder 37 for moving the bucket element B1b back and forth while the manipulator 31 grasps the extensible bar 4. Then, the holder unit D is lifted and received in the guide rails together with the rod-like stored articles C through the lower portion 15a of the guide rail 15 for feeding and/taking-out the rod-like stored articles C by winding action of the rope 9, and thereafter, the bucket element B1b is moved backward while the lifting element B1 is lowered to a position where the receiving rail 42 exists on the table means 32 so that a front portion of the receiving rail 42 is aligned with a lower portion 15a of the guide rail 15. In this condition, the lifting transverse bar 43 is lowered to be put into a briding condition with respect to the receiving rail 42. Then, all the rod-like stored articles C having been held by the holder unit D are released from the holder unit D to be taken out of the same D onto the table means 32, or a necessary amount of the rod-like stored articles C is taken out while the remaining articles C are again held by the holder unit D so that the remaining articles C are brought back to an empty storing portion A2 together with their holder unit D by a procedure reverse to that just described above.

Figure 12:
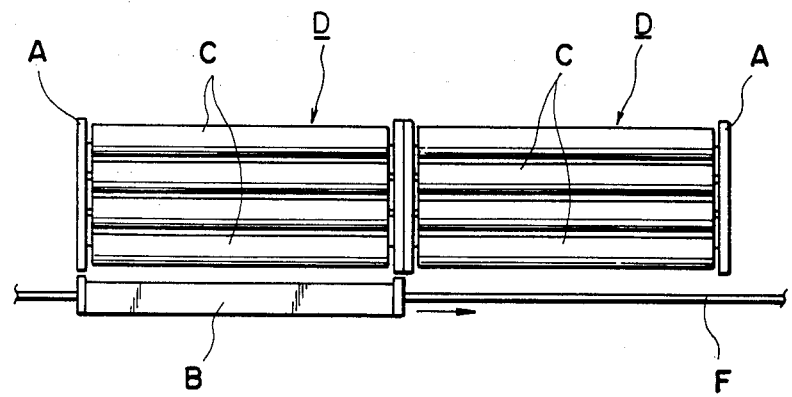
FIG. 12 is a view showing a technical idea developed from the basic idea of the present invention.

FIG. 12 is a view showing a technical idea developed from the basic idea of the present invention, shown in FIG. 1, in which view a plurality of the A-units which are constructed to receive the connected body of the articles C in a multistage manner, are installed on the floor to form a plurality of rows of the A-units. The B-unit is so constructed that it is movable on a rail F in front of the rows of the A-units.

FIGS. 13 and 14 are side views of the B-unit shown in FIG. 2. As shown in FIG. 13, in a lower portion of the B-unit, there are provided wheels 44 for transferring the B-unit on the rail F. As shown in FIG. 14, in addition to the wheels, the B-unit can be provided with suspension wheels 46 in its upper portion, which suspension wheels 46 travel along a suspension rail 45.

Figure 15:
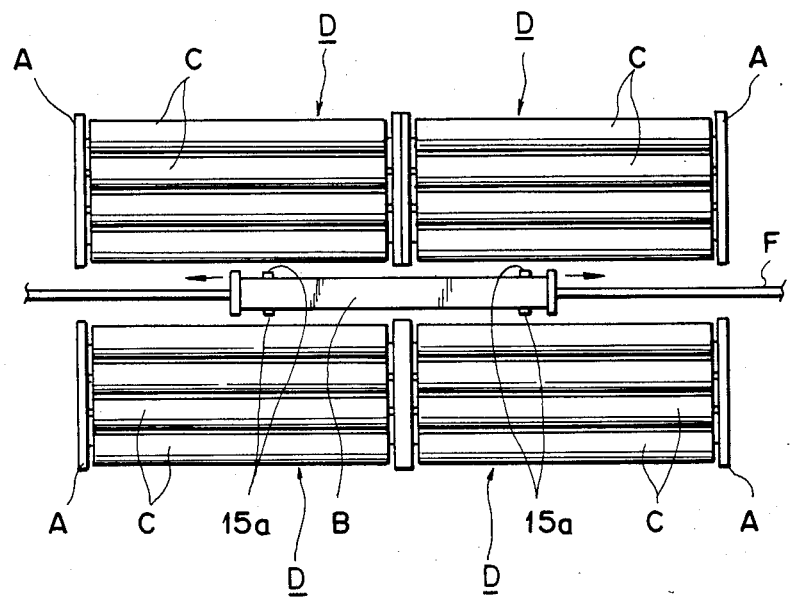
FIG. 15 is a view showing another technical idea further developed from the basic idea of the present invention.

FIG. 15 is a view showing another technical idea further developed from the basic idea through the apparatuses shown in FIGS. 1 to 12, in which view a plurality of the A-unit are installed on the floor to form a plurality of rows of the A-units, in front of which rows is provided the rail F in front of which a further plurality of rows of additional A-units are installed on the floor to form a symmetrical arrangement of the rows of the A-units with respect to the rail F. In FIG. 15, the B-unit can travel on the rail F as is in the case shown in FIG. 2. However, in this case shown in FIG. 15, the lower portion 15a of the guide rail 15 for feeding and taking-out the rod-like stored articles C of the B-unit is branched and curved into two portions 15a to open to both sides of the B-unit so that the thus branched and curved two portions 15a are opposite to the rows of the A-units, which rows are symmetrically disposed in both sides of the rail F as shown in FIG. 15, which branched and curved two portions 15a are individually controlled by a suitable means, which will be described later, to be opened and closed in their openings.

Figure 16:
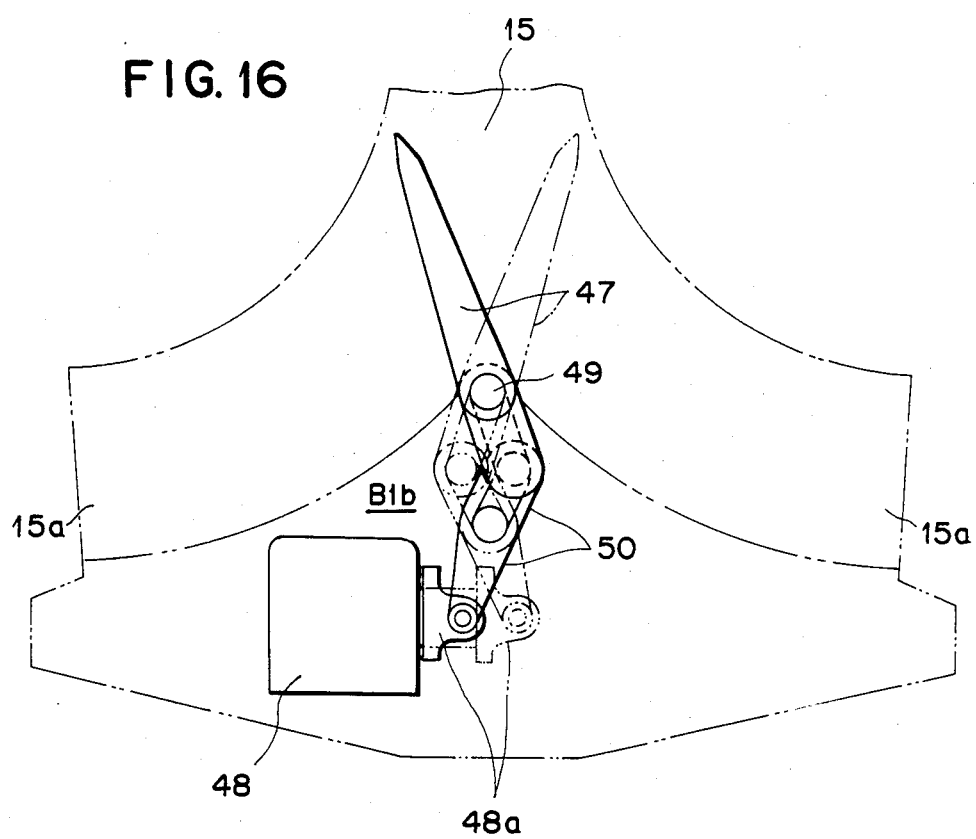
FIG. 16 is a front view of an example of a shutoff mechanism for a branching portion of the guide rail for feeding and taking-out of the rod-like articles.

FIG. 16 is a front view of an example of a mechanism for alternatively opening and closing the openings of the branched and curved two portions 15a of the guide rail 15, in which front view the openings of the branched and curved two portions 15a are individually opened and closed by the following means:

Namely, the reference numeral 47 designates a closing plate; 48 designates a solenoid; and 48a designates a plunger of the solenoid 48. A portion near a lower end portion of the closing plate 47 is rotatably mounted on a pin 49 fixed to the bucket element B1b. A top portion of the plunger 48a is connected to a lower end portion of the closing plate 47 through a linkage 50. As shown in FIG. 16, when the plunger 48a is retracted, the closing plate 47 is placed in a position shown with a solid line, while when the plunger 48a is projected, the closing plate 47 is placed in another position shown wiht a phantom line, so that the openings of the branched and curved two portions 15a of the guide rail 15 are alternatively closed and opened.

The above alternative closing and opening operation of the openings of the branched and curved portions 15a of the guide rail 15 may be also realized by a suitable embodiment such as that shown in FIG. 19, in which embodiment the guide rail 15 is constructed of one straight upper portion and two curved lower portions 15a which are adjacent to and connected to each other so that their openings are directed to both sides of the B-unit as is in case that shown in FIG. 15, which straight upper portion is independent of the two curved lower portions 15a, whereby it is possible to laterally move the straight upper portion of the guide rail 15 relative to the two curved lower portions 15a thereof so that a connection between the straight upper portion and one of the curved lower portions 15a is disconnected while another connection betwewen the same straight upper portion and the other one of the curved lower portions 15a is established. This connecting and disconnecting operation of the embodiment shown in FIG. 19 is equivalent to the opening and closing operation of the closing plate 47 shown in FIG. 16.

In either case, since the guide rail 15 is provided in each of the left and the right sides of the B-unit, such connecting and disconnecting operation or opening and closing operation must be synchronized in both the left and the right sides of the B-unit.

In the above, though the preferred embodiments of the present invention are described, the scope of the present invention is not limited to them. It is believed that certain modifications and alterations of the preferred embodiments are made within the scope of the present invention.

What is claimed is:

1. An apparatus for storing and taking-out a rod-like article which comprises:
    a holder unit having traveling wheels for holding a plurality of rod-like articles, comprising a plurality of holding members which provide catchers for receiving said rod-like articles, said holding members being connected with each other in a foldable, ladder-like manner to form a single connected body, and a connecting pipe on an end portin thereof;
    a storing frame unit and a plurality of storing portions, said storing portions comprising parallel channels for receiving said traveling wheels of said holder unit and inclined downward from the front face of said frame for storing substantially horizontally said holder unit and said received rod-like articles;
    a feeding and taking-out unit movable laterally relative to the said front face of said storing frame comprising a lifting element B having a clamping manipulator to receive the connecting pipe and lifting guide element B2 to withdrawn said holder unit and rod-like articles from said storing portions of said storing frame unit, to hold said holder unit and rod-like articles during transfer to and from said storing frame unit, and to feed said holder unit and rod-like articles to a selected position of the storing frame unit; and
    means for raising and lowering said manipulator and for moving said feeding and taking-out unit laterally relative to said storing frame unit.

2. An apparatus for storing and taking-out a rod-like article according to claim 1, wherein said storing frame unit and said feeding and taking-out unit are installed on a floor opposite to each other.

3. An apparatus for storing and taking out rod-like articles according to claim 1, wherein a plurality of said storing frames are installed on a floor to form lateral rows and said feeding and taking-out unit is positioned in front of said lateral rows and is provided with rail and wheel means for movement laterally along said rows.

4. An apparatus for storing and taking out rod-like articles according to claim 3 wherein said feeding and taking-out unit is provided on said rail on said floor and in front of and behind which feeding and taking out unit a plurality of said lateral rows of said storing frame units are installed on said floor;
    said feeding and taking-out unit has a guide rail (15) comprising one upper portion and two lower portions (15a) which are adjacent to and connected to each other, which upper portion is independent of said two lower portions so that said upper portion is moveable laterally relative to said lower portions, whereby connection between said upper portion and one of said two lower porions may be disconnected and connection between said upper portion and said other of said two lower portions may be established.

5. An apparatus for storing and taking-out rod-like articles according to claim 4, wherein said guide rails are provided with means for moving said opposite sides relative to each other so as to adjust the distance therebetween.

6. An apparatus for storing and taking-out rod-like articles according to claim 4, wherein said guide rail is provided with a rack which engages a pinion provided in a rotation bar of said feeding and taking-out unit.

7. An apparatus for storing and taking-out rod-like articles according to claim 1, wherein said channels (1) of said storing frame unit have a V-shaped cross-section, in which said travelling wheel 50 of said holder unit D travels, which travelling wheel is constructed from a thin plate.

8. An apparatus for storing and taking out rod-like articles according to claim 1, wherein:
    said feeding and taking-out unit comprises a lifting main body (B1a) and a bucket element (B1b), and wherein said lifting main body is provided with horizontal rails (38) and said bucket element is provided with guide wheels (39) engaged in said rails, and an hydraulic cylinder (37) for reversibly rotating said guide wheels.

9. An apparatus for storing and taking-out rod-like stored articles according to claim 8, wherein said holder unit D is comprised of link plates 3a connected through shaft pins 3b to each of which are mounted said travelling wheel and a catcher.

10. An apparatus for storing and taking-out rod-like articles according to claim 8, wherein said feeding and taking out unit is guided by a guide post to which a plurality of engaging projections are provided at fixed intervals and a retractable engaging bar is provided in said lifting main body, which engaging bar is engaged with said engaging projection when said engaging bar is projected.

11. An apparatus for storing and taking-out rod-like articles according to claim 8, wherein a lifting means for lifting said bucket element of said feeding and taking-out unit is provided.

12. An apparatus for storing and taking-out rod-like articles accordig to claim 8, wherein said bucket element is supported by said lifting main body through a rail and a wheel and said distance between said guide rails is adjusted by rotation of screw shafts which are provided in upper and lower portions of said lifting main body, said screw shafts being provided with left and right screw portions, said screw shaft cooperating wiht screw gears provided in upper and lower portions of said guide rails.

13. An apparatus for storing and taking-out rod-like articles according to claim 1, wherein a receiving rail 42 for said connected body of said rod-like stored articles held by said holder unit is provided in a lower space of said storing frame, and a receiving table means 32 is provided under said receiving rail.

14. An apparatus for storing and taking-out rod-like articles according to claim 1, wherein said holder unit comprises a plurality of left and right link plates having a plurality of link elements, shaft pins having said travelling wheels and connecting pipes provided in front and rear end portions of said right and left link plates through extensible bars.

* * * * *